J. R. SAYLOR.
CHUCK.
APPLICATION FILED JULY 8, 1911.

1,008,926.

Patented Nov. 14, 1911.

Witnesses—

Inventor—
John R. Saylor
by his Attorneys

COLUMBIA PLANOGRAPH CO., WASHINGTON, D. C.

UNITED STATES PATENT OFFICE.

JOHN R. SAYLOR, OF POTTSTOWN, PENNSYLVANIA.

CHUCK.

1,008,926.

Specification of Letters Patent.

Patented Nov. 14, 1911.

Application filed July 8, 1911. Serial No. 637,415.

*To all whom it may concern:*

Be it known that I, JOHN R. SAYLOR, a citizen of the United States, residing in Pottstown, county of Montgomery, State of Pennsylvania, have invented certain Improvements in Chucks, of which the following is a specification.

My invention relates to certain improvements in chucks, and particularly those adapted for holding work while being finished by a cutter or other tool.

The object of the invention is to provide a chuck which will firmly hold the work and in which both jaws are operated from a single spindle. Each jaw has a certain freedom of movement; preventing any play of the jaws of the chuck on the base.

Figure 1:
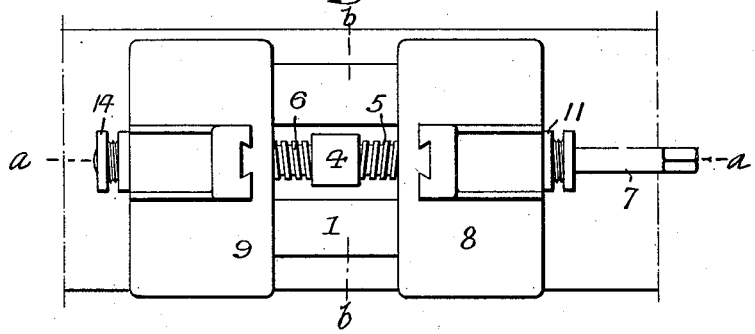
Figure 2:
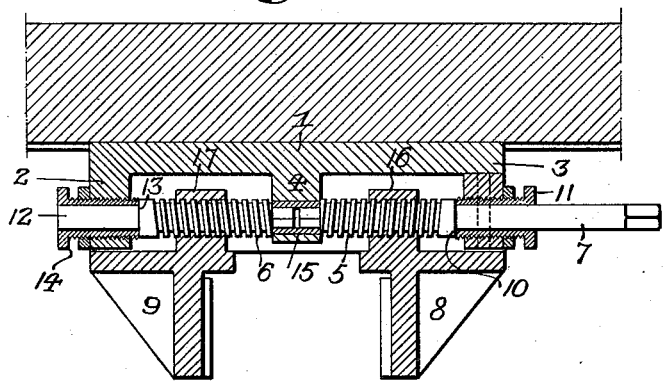
Figure 3:
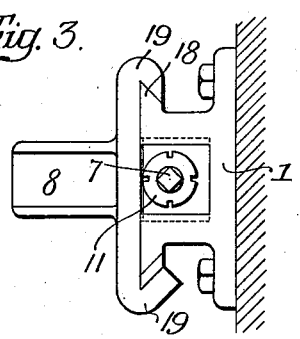
Figure 4:
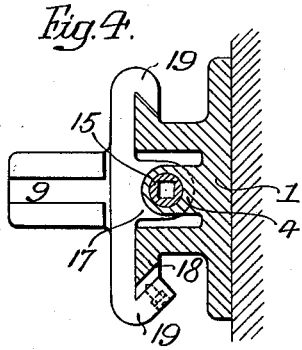
Figure 5:
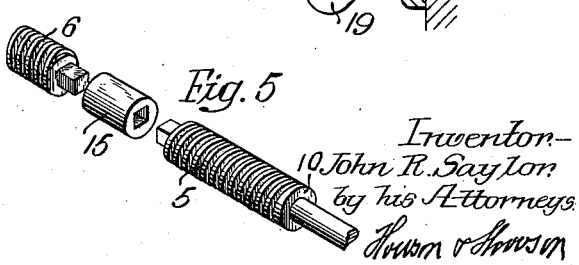

In the accompanying drawings:—Figure 1, is a face view of my improved chuck; Fig. 2, is a sectional view on the line *a—a*, Fig. 1; Fig. 3 is an end view; Fig. 4, is a transverse sectional view on the line *b—b*, Fig. 1; and Fig. 5, is a detached perspective view of the two screws and the coupling sleeve.

1 is the base of the chuck having three bearings, 2, 3 and 4, for the screws 5 and 6. One of these screws is a right hand thread and the other is a left hand thread. The screw 5 has a long stem 7 and is shaped to be engaged by a key or wrench by which it is turned and through which motion is imparted to both jaws.

8 and 9 are two jaws having projecting members shaped to any form desired; according to the article to be held by the chuck.

The stem 7 of the screw 5 is reduced, forming a shoulder 10, and bearing against this shoulder is a threaded adjusting sleeve 11 adapted to a threaded opening in the bearing 3.

The stem 12 of the screw 6 is also reduced, forming a shoulder 13 and a threaded adjusting sleeve 14 extends through the bearing 2 and rests against the shoulder 13. The inner end of each screw is reduced in diameter and shaped to conform to the opening in a connecting sleeve 15, which is mounted in the bearing 4. In the present instance, the opening is square and the inner ends of the screws are also square. By this construction, when the screw 5 is turned, motion is also imparted to the screw 6 through the connecting sleeve 15.

The jaw 8 has a threaded lug 16 through which the screw 5 passes and the jaw 9 has a threaded lug 17 for the reception of the screw 6. As one of these screws is a right hand screw and the other is a left hand screw, the jaws will be moved toward and from each other, when the screws are turned.

When the article to be held in the chuck is clamped by the jaws, then longitudinal pressure will be applied to the screws, tending to force them apart and this pressure will be taken by the sleeves 11 and 14, due to the fact that they bear against the shoulders of the respective screws; the screws being free to move longitudinally and independently one of the other. Consequently, when the work is firmly engaged by the jaws, each jaw is rigidly held as the screw bears against its particular sleeve and the sleeves can be adjusted to take up the wear so as to make a rigid grip; thus taking up all lost motion between the jaws and the base.

The great difficulty in chucks of this type is that while the two jaws may be rigidly connected the screw is loose in the base and, consequently, there is a lost motion between the jaws and the base.

In the present instance, the base has an undercut beveled flange 18. Each side and each jaw has a lip 19 which extends over the edge of the base so that while the jaws are free to slide on the base they cannot be detached therefrom.

While the invention is especially adapted to hold work in a machine, it can be used for holding any work, either in a machine or on a bench, without departing from the essential feature of the invention.

I claim:

1. The combination of a base, bearings thereon; two jaws arranged to slide on the base; two screws; one engaging the threads on one jaw and the other engaging the threads on the other jaw; a coupling connecting the two screws so that they will turn together, but will have a limited longitudinal movement; with stops against which the screws bear when the work is clamped between the jaws.

2. The combination of a base; two jaws mounted so as to slide on the base; a right hand and a left hand screw; a coupling connecting the two screws so that they will turn in unison, but will have a certain longitudinal movement; one screw engaging one jaw and the other screw engaging the other jaw; threaded sleeves through which the spindles of the screws extend; said sleeve being adjustably mounted in the end bearings of the base; the parts being so arranged that when one screw is turned the other will turn with it, causing the jaws to move toward and from each other to clamp the article and when the article is clamped, the pressure of the jaws will be directly against the sleeve on the frame, preventing any lost motion between the base and the jaws.

3. The combination of a base; two end bearings and a center bearing thereon; slideways on the base; two jaws mounted on the slideways and having depending, threaded lugs; two shouldered screws, one a right hand screw and the other a left hand screw; each screw having a reduced spindle forming the shoulder; a threaded sleeve in each end bearing resting against the shoulder of a screw; a sleeve mounted in the center bearing between the two screws; the inner ends of the screws being shaped to engage the sleeve so that both screws must turn in unison, but will be free to move longitudinally; the spindle of one of said screws being shaped to receive a key or wrench by which it is turned.

In testimony whereof, I have signed my name to this specification, in the presence of two subscribing witnesses.

JOHN R. SAYLOR.

Witnesses:
    Wm. E. Shupe,
    Wm. A. Barr.

---

Copies of this patent may be obtained for five cents each, by addressing the "Commissioner of Patents, Washington, D. C."